A. MALEK.
WOOD SCRAPER OR SURFACER.
APPLICATION FILED JUNE 20, 1912.
1,068,683.
Patented July 29, 1913.
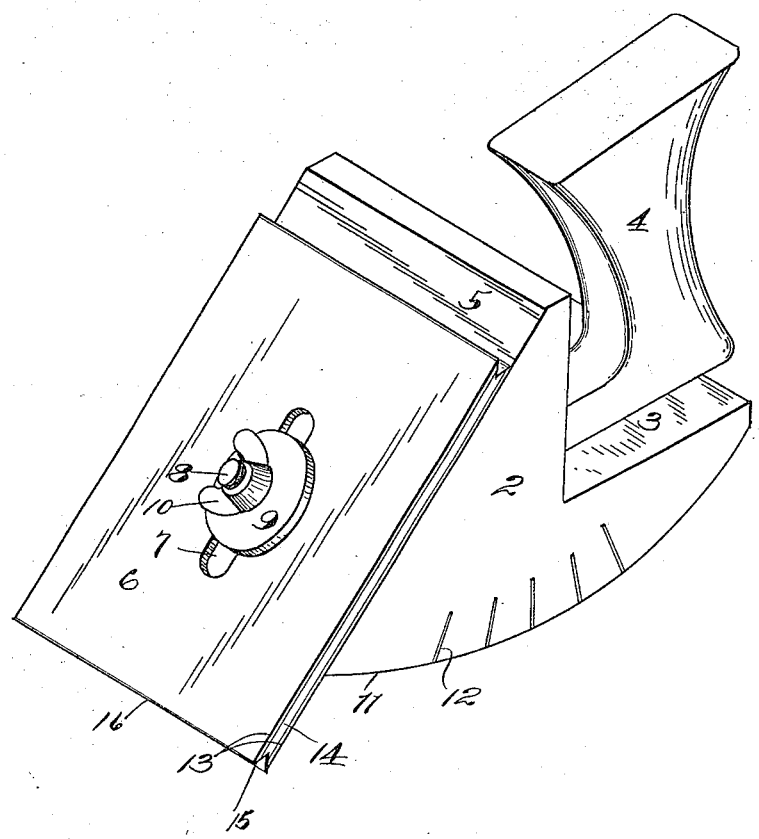
WITNESSES:
F. E. Maynard.
Frances V. Cole
INVENTOR
Albert Malek,
BY G. H. Strong.
ATTORNEY

UNITED STATES PATENT OFFICE.

ALBERT MALEK, OF MOUNTAIN VIEW, CALIFORNIA.

WOOD SCRAPER OR SURFACER.

1,068,683.  Specification of Letters Patent.  Patented July 29, 1913.

Application filed June 20, 1912. Serial No. 704,761.

*To all whom it may concern:*

Be it known that I, ALBERT MALEK, a citizen of the United States, residing at Mountain View, in the county of Santa Clara and State of California, have invented new and useful Improvements in Wood Scrapers or Surfacers, of which the following is a specification.

The object of the present invention is to provide an effective scraper for surfacing wood and like materials, the scraper being adjustable and having a removable and double reversible scraping blade in addition to a plurality of inserted blades mounted in a convex surface to which is connected a handle.

The figure is a perspective view of the scraper.

In the illustrated form of my invention 2 represents a body or block, which is provided at its rear portion with a seat 3 upon which may be secured a grip or handle 4. The forward upwardly projecting portion of the body of the block 2 is inclined, as at 5, and forms a rest or support for a scraper plate 6 of appropriate width and length, having a central, longitudinal slot 7 through which projects a lag screw 8 fastened in the block 2. The scraper blade 6 is clamped on its rest or supporting surface 5 by a washer 9 upon which bears a wing nut 10 threaded on the screw 8.

The lower surface of the block or body 2 is formed with a suitable curved or rolling surface 11 in which is arranged a series of blades 12 firmly embedded in the body 2 and of which a suitable number may be provided, the edges of these blades normally projecting a slight distance beneath the surface 11, which in practice is found to wear away slightly faster than the edges of the scraper blades 12 so that there is constantly presented, projecting from the surfaces 11, slight transversely extending toothlike edges from the blades 12 which preferably are made of thin, strong and durable material. The amount of projection or overhang which the lower end of the primary scraper blade 6 may have can be adjusted by unlocking the wing nut 10 from the clamp shear 9 and longitudinally shifting the blade until the desired amount of projection is obtained. Manifestly the variable adjustment of the lower edge of the scraper 6 will cause the curved surface 11 to bear at different points according to the amount of projection of the scraper from beyond the end of the curved surface 11.

An important object of the present scraper is to provide a tool which may be used for a considerable length of time without requiring the entire removal of the main cutter or blade 6 for sharpening, and this increase of the period of usefulness of the tool is obtained by forming the cutter 6 of laminated construction in which the outer laminations 13 are of suitable, durable tool or other steel, spaced by and mounted upon a central body or filler 14 which preferably is brass or some other material softer than the tool blades 13.

The purpose of the peculiar laminations of the blades 13 and 14 is that when the scraper 6 is to be sharpened by using a triangular file and inserting one of its corners upon the tool and reciprocating the file, the central soft material 14 will be cut away longitudinally, as to its edge, and the harder cutting materials 13 will be beveled, as at 15. The advantage of this composite type of cutter 6 is that it may be sharpened with greater rapidity and accuracy than would be the case were the cutter composed of a single piece, especially of tool steel. By my construction the short stock or body 14 is rapidly cut away by a sharpening file, leaving the beveled edges 15 true, after which they may be burnished or otherwise processed so as to throw back transversely projecting slight flanges or burs 16 on each opposite corner of the scraper tool 6.

The tool thus constructed enables four edges on each side of the blade to be used. The tool cutter 6 may be reversed endwise by swinging it about the bolt 8 thus presenting a new cutting edge for operation. It will be seen that the cutter blade 6 is formed with four separate, usable scraping edges or burs 16 and that the tool as a whole can be used continuously until all four of the cutting burs 16 have been worn before it is necessary to again refile the cutter.

The advantage of forming a rolling surface, as 11, under the block 2 is to accommodate the device to different conditions both as to the nature of the material to be scraped and also as to the angle of draft on the handle 4, and the rolling surface enables the adjustment of the blades 6 relative to the rolling surface so that the different scraper blades 12 may be brought into operation at divers times.

Having thus described my invention, what I claim and desire to secure by Letters Patent, is—

A scraping tool cutting blade composed of exterior steel plates, and an intermediate plate of softer material, said compound plate being grooved along the edges to form cutting edges.

In testimony whereof I have hereunto set my hand in the presence of two subscribing witnesses.

ALBERT MALEK.

Witnesses:
 E. S. McGraw,
 James Redpath.

Copies of this patent may be obtained for five cents each, by addressing the "Commissioner of Patents, Washington, D. C."